United States Patent
Matsumoto et al.

[11] Patent Number: 6,104,678
[45] Date of Patent: Aug. 15, 2000

[54] DISK PLAYBACK DEVICE AND METHOD OF TERMINATING PLAYBACK OF DISK

[75] Inventors: Katsuyuki Matsumoto; Masanao Yoshida, both of Osaka; Yoshimasa Ono, Higashiosaka; Shinya Miyazona, Amagasaki; Hitoshi Miyamoto, Daito; Shigeru Ueuchi, Hirakata, all of Japan

[73] Assignees: Sanyo Electric Co., Ltd.; Sanyo Tecnosound Co., Ltd., both of Osaka, Japan

[21] Appl. No.: 09/108,221

[22] Filed: Jul. 1, 1998

[30] Foreign Application Priority Data

Jul. 2, 1997 [JP] Japan ..................... 9-177089
Dec. 19, 1997 [JP] Japan ..................... 9-351096

[51] Int. Cl.⁷ .................................. G11B 17/22
[52] U.S. Cl. ............................................. 369/33
[58] Field of Search ................... 369/33, 34, 30, 369/32, 47, 48, 58, 178, 36

[56] References Cited

U.S. PATENT DOCUMENTS 5,199,019  3/1993  Matsumura et al. ............... 369/60
5,224,089  6/1993  Matsumura et al. ............... 369/124
5,457,672  10/1995  Shinada et al. ..................... 369/47
5,559,776  9/1996  Ikenaga ............................. 369/47
5,680,379  10/1997  Ishida et al. .

FOREIGN PATENT DOCUMENTS

0544504 A2  6/1993  European Pat. Off. .
0595225 A2  5/1994  European Pat. Off. .
0601814 A2  6/1994  European Pat. Off. .
5-85980  12/1993  Japan .
9-69263  3/1997  Japan .
2295481  5/1996  United Kingdom .

*Primary Examiner*—Tan Dinh
*Attorney, Agent, or Firm*—Armstrong, Westerman, Hattori, McLeland & Naughton

[57] ABSTRACT

A system control circuit checks a memory for data therein through a memory control circuit upon a pickup reaching the end of the disk. When at least a predetermined quantity of data remains in the memory, signaling sound generating means produces a signaling sound three times and a display portion is caused to flash. On the other hand, if the quantity of data remaining in the memory is not greater than a predetermined amount, the sound generating means produces a prolonged signaling sound once and causes the display portion to flash. The display operation is terminated if no disk change is made within a specified period of time thereafter.

5 Claims, 9 Drawing Sheets

DISK PLAYBACK DEVICE AND METHOD OF TERMINATING PLAYBACK OF DISK

FIELD OF THE INVENTION

The present invention relates to disk playback devices, such as compact disk players, which permit a change of disk without a break in the reproduced sound.

BACKGROUND OF THE INVENTION

The disks to be described below are those having music information recorded thereon, whereas such disks may be those having English conversation or other programs recorded thereon.

With common disk playback devices, a break occurs in the sound reproduced from disks during a change from one disk played back to another disk. This gives discomfort to the user who is desirous of listening to the reproduced sound without any interruption. In view of such experience, playback devices have been proposed which permit a change of disk without a break in the reproduced sound (see JP-A No. 69263/1997).

The proposed device is of the so-called autochanger type, which has a stacker 8 for accommodating a plurality of disks D as arranged one above another as shown in FIG. 9. The disk D is delivered from the stacker 8 by a change hand 81 of a disk changer mechanism 80. The disk D is placed on a turntable 73, and a reproduction signal is retrieved from the disk by a pickup 2 which is slidable radially of the disk. With an error signal taken out by an RF amplifier circuit 20, the reproduction signal is stored in a memory 5 by a system controller 82. Since the signal is written to the memory 5 at a rate which is always higher than the reading rate, a predetermined quantity of data is stored in the memory 5 at all times.

For a change of disk, the system controller 82 operates the disk changer mechanism 80, which places the disk on the turntable 73 into the stacker 8 and automatically takes out another disk from the stacker 8. During the changing procedure, the data remaining in the memory 5 is reproduced with no break occurring in the reproduced sound.

Portable disk playback devices have been proposed in recent years. With reference to FIG. 10 showing such a device, a base frame 70 for placing a disk thereon has a closure 7 pivoted to one side portion thereof and positionable over the disk. The disk on the playback device needs to be replaced by another one by the user himself. However, the user, while listening to the reproduced sound, is unable to recognize when to change the disk because he has no means to detect a time immediately before the completion of playback of the disk.

Such a portable disk playback device has also been proposed which is adapted to temporarily store the sound reproduced from the disk in a memory 5 and output the sound a predetermined period of time thereafter (see JP-B No. 85980/1993). The device has a vibration proof function and is adapted to correct skipping of sound. As shown in FIG. 8, the device has memory means 55 for storing the sound reproduced from the disk in the order of addresses, and sensor means 56 for detecting discontinuity of time code of the reproduced sound, i.e., inaccurate reproduction. Upon the sensor means 56 detecting a discontinuity in the time code, the pickup 2 is moved back to a position on the disk before the occurrence of the discontinuity, with writing to the memory means 55 suspended during the movement of the pickup 2. The writing to the memory means 55 is resumed after the pickup 2 has been moved. The location of the skip is not stored in the memory means 55, permitting a speaker 91 to output the reproduced sound without any break.

SUMMARY OF THE INVENTION

The present applicant has conceived the idea that even portable disk playback devices can be adapted for a disk change without a break in the reproduced sound when the device is provided with means for notifying the user of disk change timing, utilizing memory means for temporarily storing the sound reproduced from disks.

An object of the present invention is to provide a portable disk playback device which is adapted to notify the user of disk change timing and to allow a speaker to continuously reproduce sound without any break during a change of disk.

Even when end sensor means detects the end of a disk, a memory 5 continues to output the reproduction signal without a interruption. Notifying means informs the user of the arrival of data read means at the end of a disk, that is, informs the user that the time to change the disk is imminent. While the user is changing the disk in response to the informing signal, data is output from the memory 5, obviating a break in the delivery of reproduction signal and consequently eliminating the likelihood of giving discomfort to the user who desires to listen to the reproduced sound continuously.

DETAILED DESCRIPTION OF THE PREFERRED EMBODIMENTS

[Overall Construction]

Figure 10:
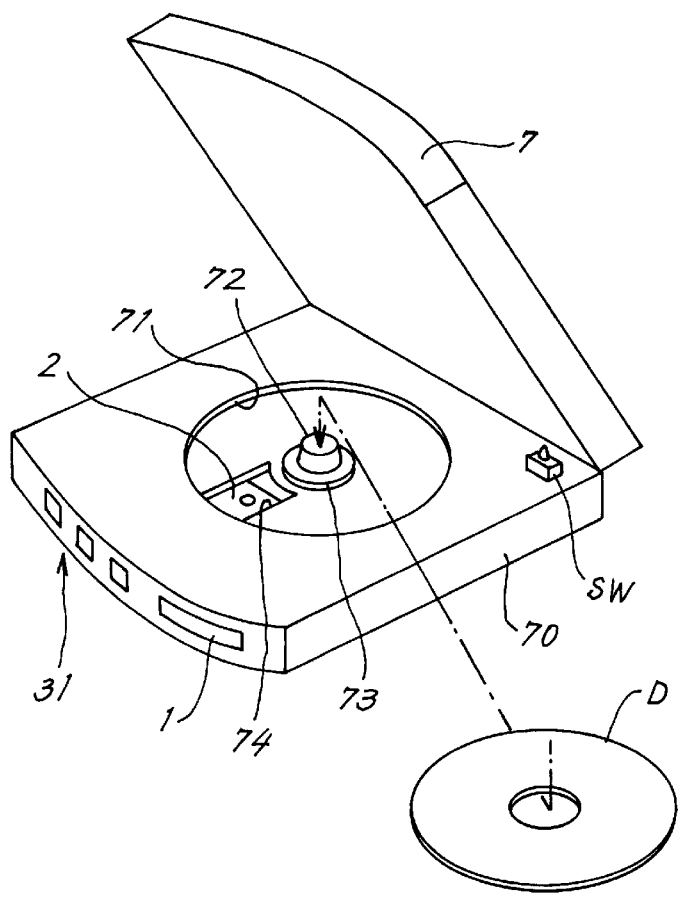
FIG. 10 is a perspective view of a portable disk playback device.

FIG. 10 is a perspective view of a disk playback device of the type described. The device, which is for portable use, comprises a base frame 70 formed with a recessed portion 71 for placing a disk therein. A closure 7 is pivoted at its base end to one side portion of the frame 70. Projecting from the central part of the recessed portion 71 are a turntable 73 for placing a disk thereon, and a clamp member 72 fittable in the center hole of the disk. A pickup 2 is slidably provided below a window 74 formed in the recessed portion 71. The disk is played back with the closure 7 closed. Mounted on the base frame 70 is a switch SW which is positioned toward the pivoted portion of the closure 7 and which is turned on when the closure 7 is closed. When the disk is to be replaced by another one, the closure 7 is opened, whereby the switch SW is turned off. The front side of the base frame 70 is provided with a display portion 1 for indicating the total number of pieces of music recorded on the disk, total playback time, number of piece of music currently being played back and elapsed playback time. The frame front side is also provided with a group of manual keys 31 to be manipulated by the user for entering operating data.

Figure 1:
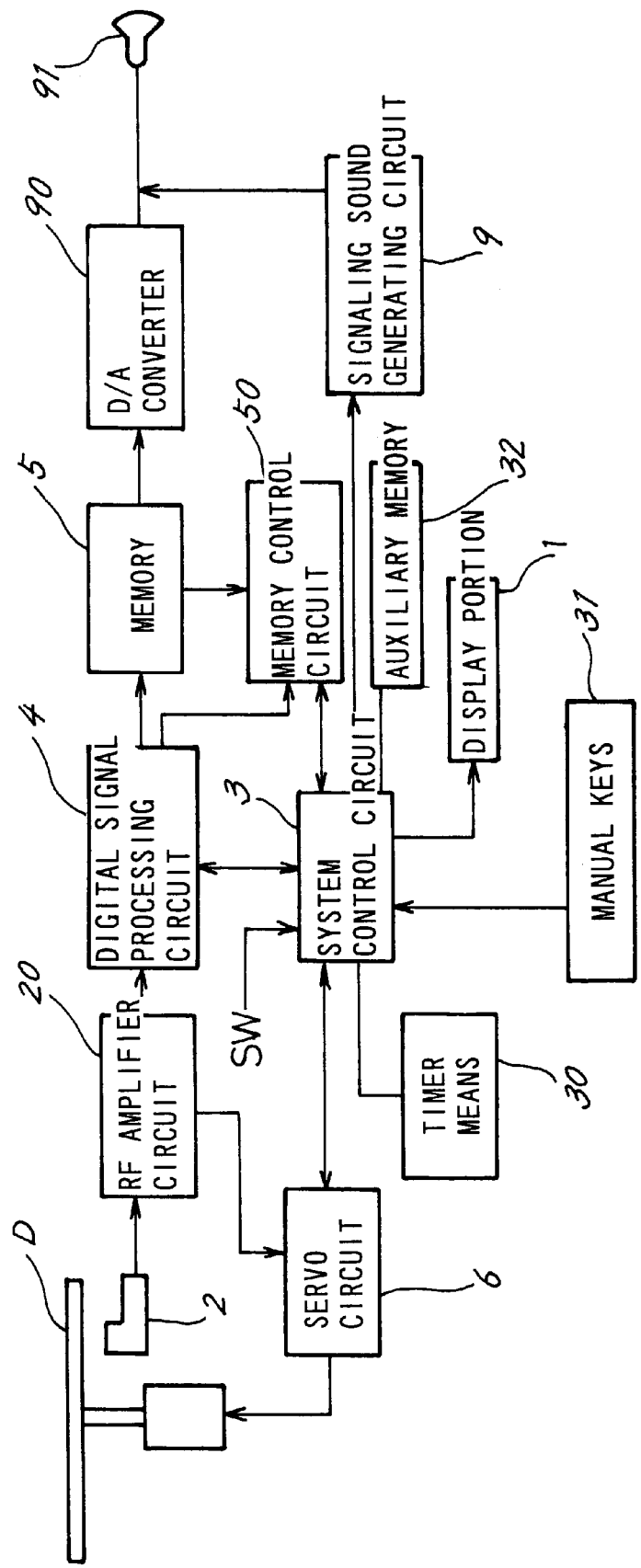
FIG. 1 is a block diagram of a disk playback device embodying the invention.

FIG. 1 is a block diagram showing the construction of the disk playback device. The data read from the disk D by the pickup 2 is converted to a digital signal by an RF amplifier circuit 20, which also produces a tracking error signal. The digital signal is delivered from the RF amplifier circuit 20 to a digital signal processing circuit 4, in which the signal is processed, for example, for correction of errors according to CIRC (Cross Interleaved Reed-Solomon Code). The data processed by the circuit 4 is temporarily stored in a memory 5 under the control of a memory control circuit 50, which also checks the memory 5 for the quantity of data remaining therein. The memory 5 is an FIFO memory having a capacity of 16 Mbits. Assuming that the sampling bits are 4 in number, data for about 40 seconds can be stored in the memory 5. The data is delivered from the memory 5 to an D/A converter 90 and thereby converted again to an analog signal, which is delivered from a speaker 91.

The tracking error signal is output from the RF amplifier circuit 20 and fed to a servo circuit 6, which controls the operation of the pickup 2 according to the tracking error signal. The servo circuit 6 also effects a focus servo operation for accurately focusing the beam of the pickup 2 accurately on the disk.

The digital signal processing circuit 4 and the servo circuit 6 are connected to a system control circuit 3, which in turn controls these circuits 4, 6, and changes the mode of a disk playback mechanism in response to an input from the group of manual keys 31. Also connected to the system control circuit 3 are timer means 30 and an auxiliary memory 32 for temporarily storing on and off signals of the switch SW.

The system control circuit 3 is connected to a signaling sound generating circuit 9, and the memory control circuit 50 and the display portion 1. The circuit 9 produces a signaling sound immediately before the termination of playback of the disk.

[First Embodiment]

Figure 2:
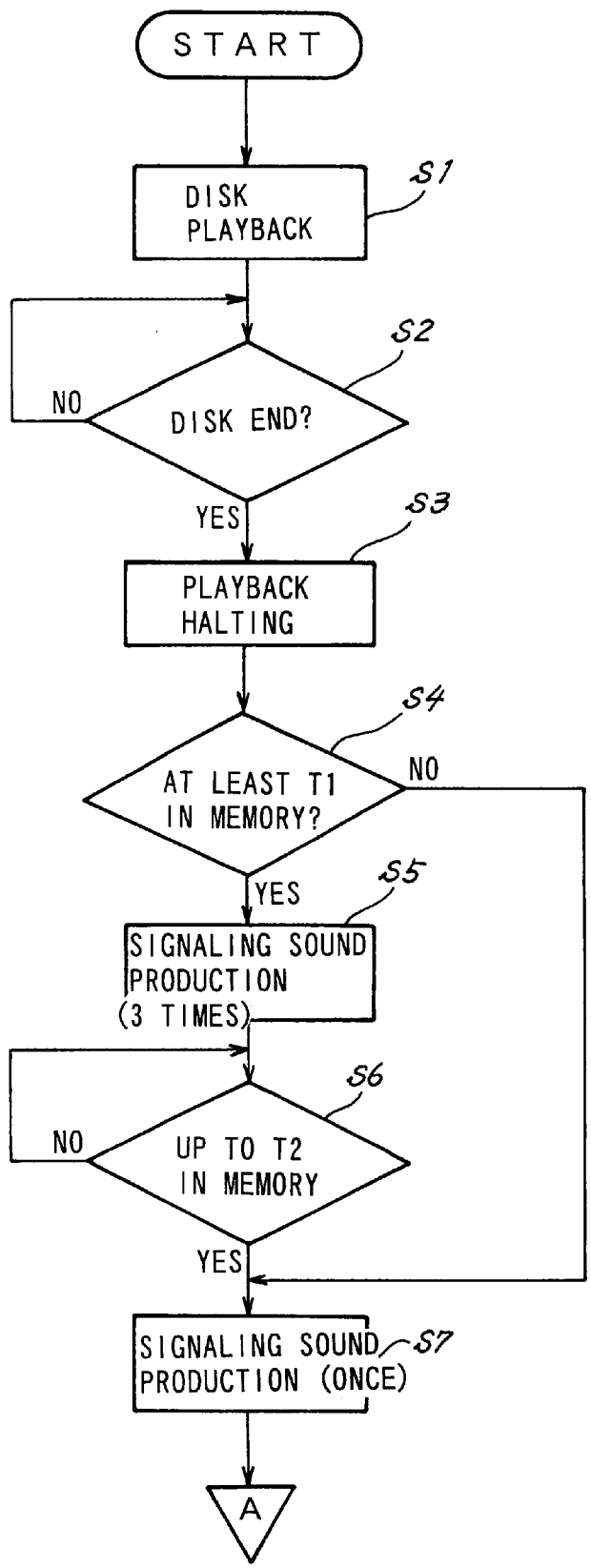
FIG. 2 is a flow chart showing an operation involving the detection of the end of a disk.
Figure 3:
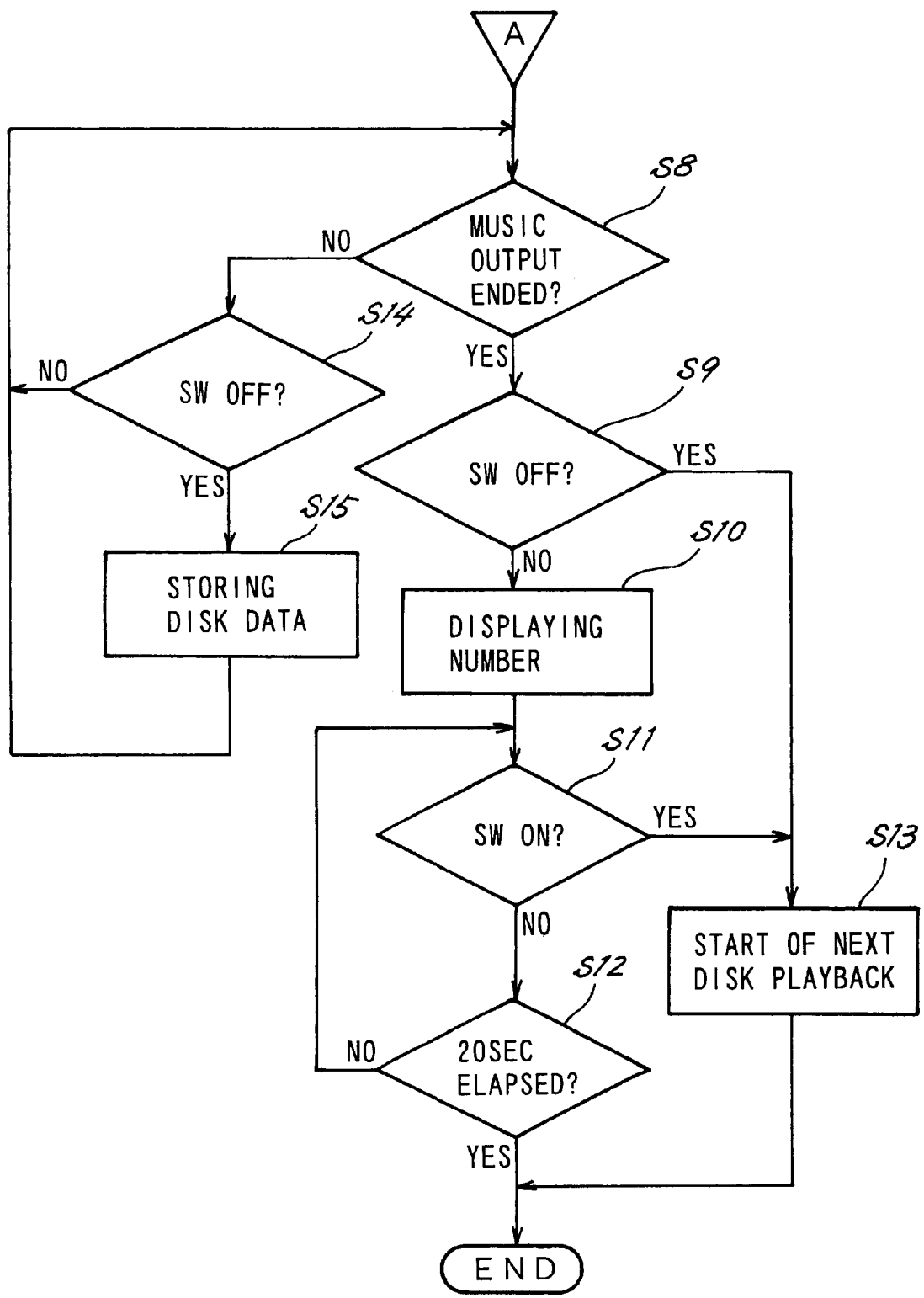
FIG. 3 is a flow chart showing the operation.

With the device of the invention, there is no break in the reproduced sound during the replacement of one disk by another disk when the playback operation of the former comes to a halt automatically. The device gives off a signaling sound to attract the user's attention when the quantity of data remaining in the memory 5 is small. The procedure of this operation will be described below with reference to the flow charts of FIGS. 2 and 3.

The pickup 2 moves outward from an inner peripheral portion of the disk to play back the disk (S1). When a code indicating the end of the disk is detected (S2) upon the pickup 2 reaching an outer peripheral portion, the playback comes to a halt (S3).

If the closure 7 inadvertently opens during the playback of the disk to turn off the switch SW, the system control circuit 3 forcibly terminates the playback to avoid damage to the disk. Accordingly, since the closure 7 is not open during the playback of the disk before the playback stops upon detection of the disk end, there is no likelihood that an off signal of the switch SW will be stored in the auxiliary memory 32 during the steps S1 to S3.

During the playback of the disk, the data from the disk is temporarily stored in the memory 5 and then output as delayed by a predetermined period of time. In other words, the reproduced data is delivered continuously for the predetermined period of time to entail no break in the reproduced sound even if the playback of the disk comes to a stop. Incidentally, the device of the invention has a vibration proof function eliminating the likelihood of a break occurring in the sound owing to vibration from outside during playback.

Figure 7:
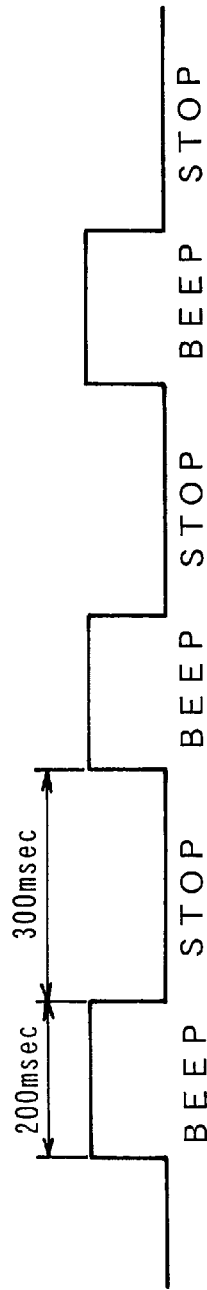
FIG. 7 is a diagram showing signaling sound production timing.
Figure 8:
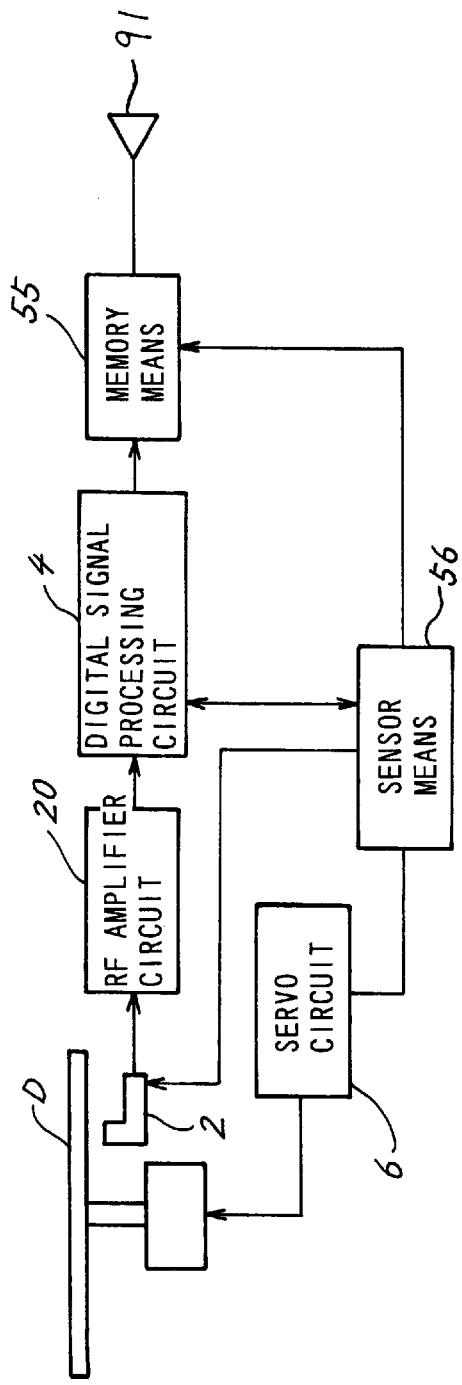
FIG. 8 is a block diagram of a conventional disk playback device having a vibration proof function.
Figure 9:
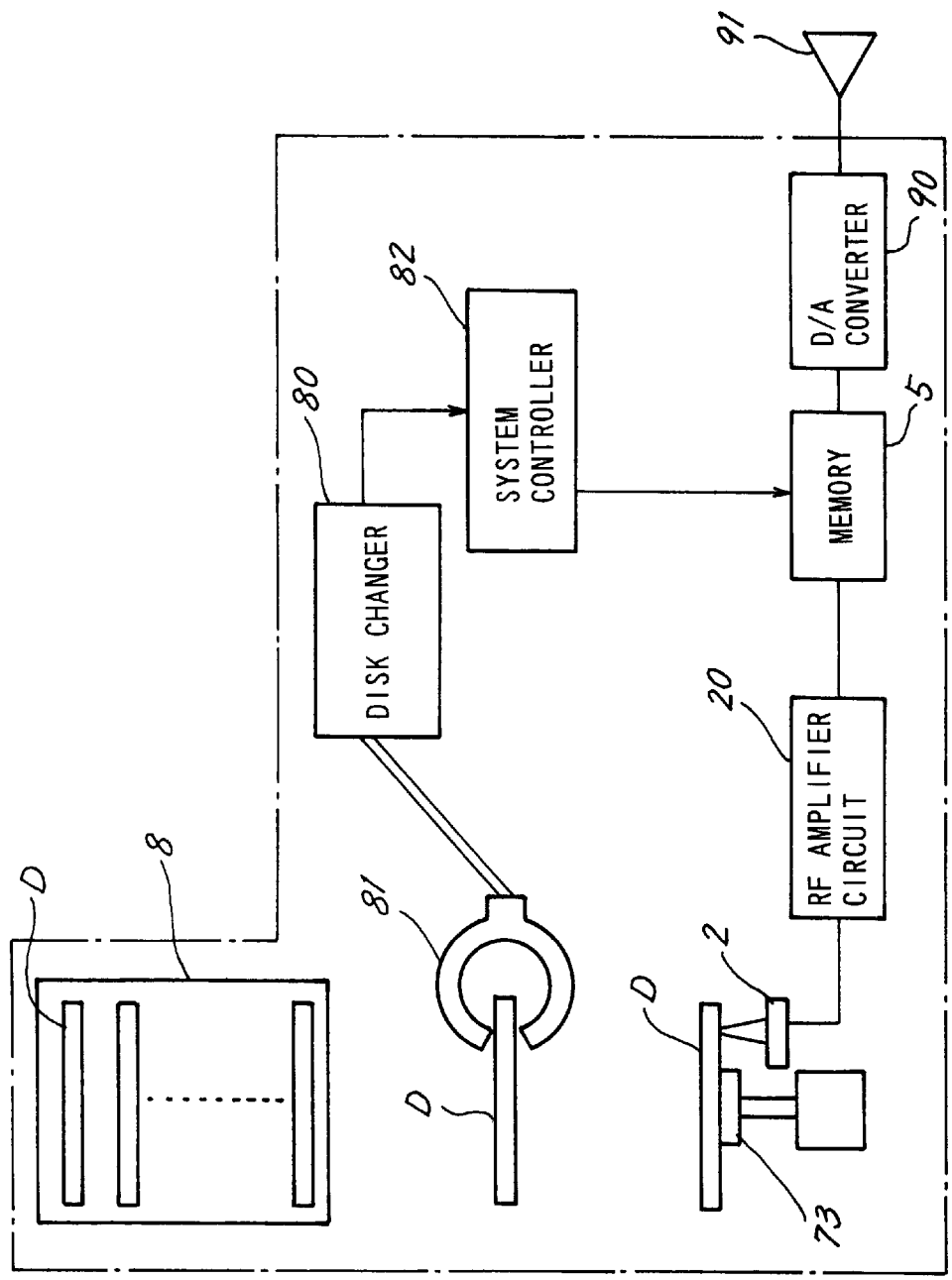
FIG. 9 is a block diagram of another conventional disk playback device.

Upon termination of playback of the disk, the system control circuit 3 activates the memory control circuit 50 to check the memory 5 for the quantity of data remaining therein (S4). When the quantity is not smaller than T1 corresponding to one-half of the entire capacity of the memory 5 plus a quantity of reproduction data for 3 seconds, the control circuit 3 actuates the signaling sound generating circuit 9 (S5). As shown in FIG. 7, the circuit 9 produces a signaling sound for 200 msec, then ceases producing for 300 msec, and repeats this cycle three times. At the same time, the display portion 1 is caused to flash as timed with the signaling sound, indicating to the user that the termination of playback is imminent.

Upon the quantity of data in the memory 5 reducing to T2, i.e., one-half of the entire capacity thereof, with continued reproduction of sound from the data in the memory 5 (S6), the system control circuit 3 activates the signaling sound generating circuit 9 to produce a signaling sound once (S7), also causing the display portion 1 to flash. The signaling sound continues for 500 msec. This sound, lasting longer than the sound signaling that the quantity of data in the memory 5 is at least T1, notifies the user that the termination of playback is imminent and that the quantity of data remaining in the memory 5 is small, thus urging the user to replace the disk.

While the music data is being delivered from the memory 5 (S8), the system control circuit 3 reads the contents of the auxiliary memory 32, checking whether the disk has been replaced in the course of steps S4 to S7 (S14). If the disk end is detected, it is unlikely that the switch SW is turned off during steps 1 to 3 as previously stated. Accordingly, an off signal, if found in the auxiliary memory 32, indicates that the closure 7 is opened once during steps S4 to S7. This is interpreted as revealing that the disk has been replaced by a new one during steps S4 to S7, and further steps then follow.

When a disk change has been made, the system control circuit 3 plays back the new disk and causes the memory 5 to store the read data (S15). If otherwise, the sequence returns to step S8. When the music data is delivered completely from the memory 5 without a disk change, step S9 follows.

After the completion of output of the music data from the memory 5, whether the disk has been replaced is checked again (S9). If the result is affirmative, the system control circuit 3 plays back the new disk (S13), causing the memory 5 to store the data. If no disk change is detected in step S9, the circuit 3 shows the number of music pieces in the previous disk played back and the total playback time on the display portion 1 (S10).

After displaying the data on the portion 1, the system control circuit 3 checks whether the disk has been replaced (S11) and actuates the timer means 30 to count 20 seconds (S12). The 20-second period is an allowance period. When the disk is replaced within this period, the new disk is promptly played back, and the reproduction data is stored in the memory 5 (S13). If the disk remains unreplaced upon lapse of the allowance time, this indicates that the user is no longer desirous of playing back disks. The system control circuit 3 terminates the disk playback operation.

[Second Embodiment]

Figure 11:
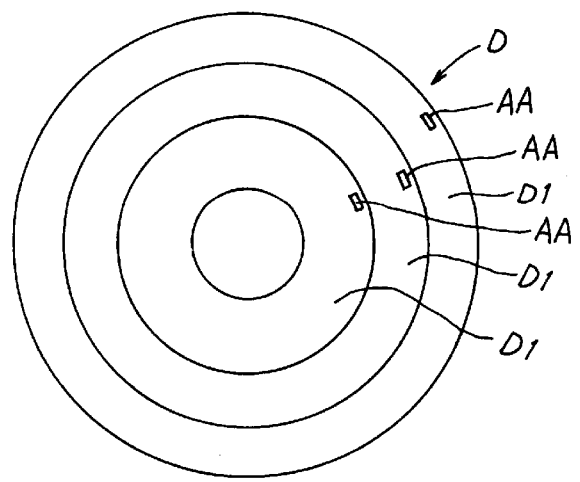
FIG. 11 is a plan view showing the tracks of a disk.

Disks include those wherein a plurality of tracks D1 is formed concentrically as shown in FIG. 11, with a piece of music recorded on each track D1. A subcode which is termed AA is recorded at the end of each track.

Every time the reproduction of piece of music recorded on each track automatically comes to a stop with the present embodiment, the device gives off a signaling sound. The operation procedure will be described below with reference to the flow charts of FIGS. 4 to 6.

When the system control circuit 3 detects the subcode AA during playback (S21), the circuit 3 checks the memory 5 for the quantity of data remaining therein via the memory control circuit 50 (S23).

Figure 6:
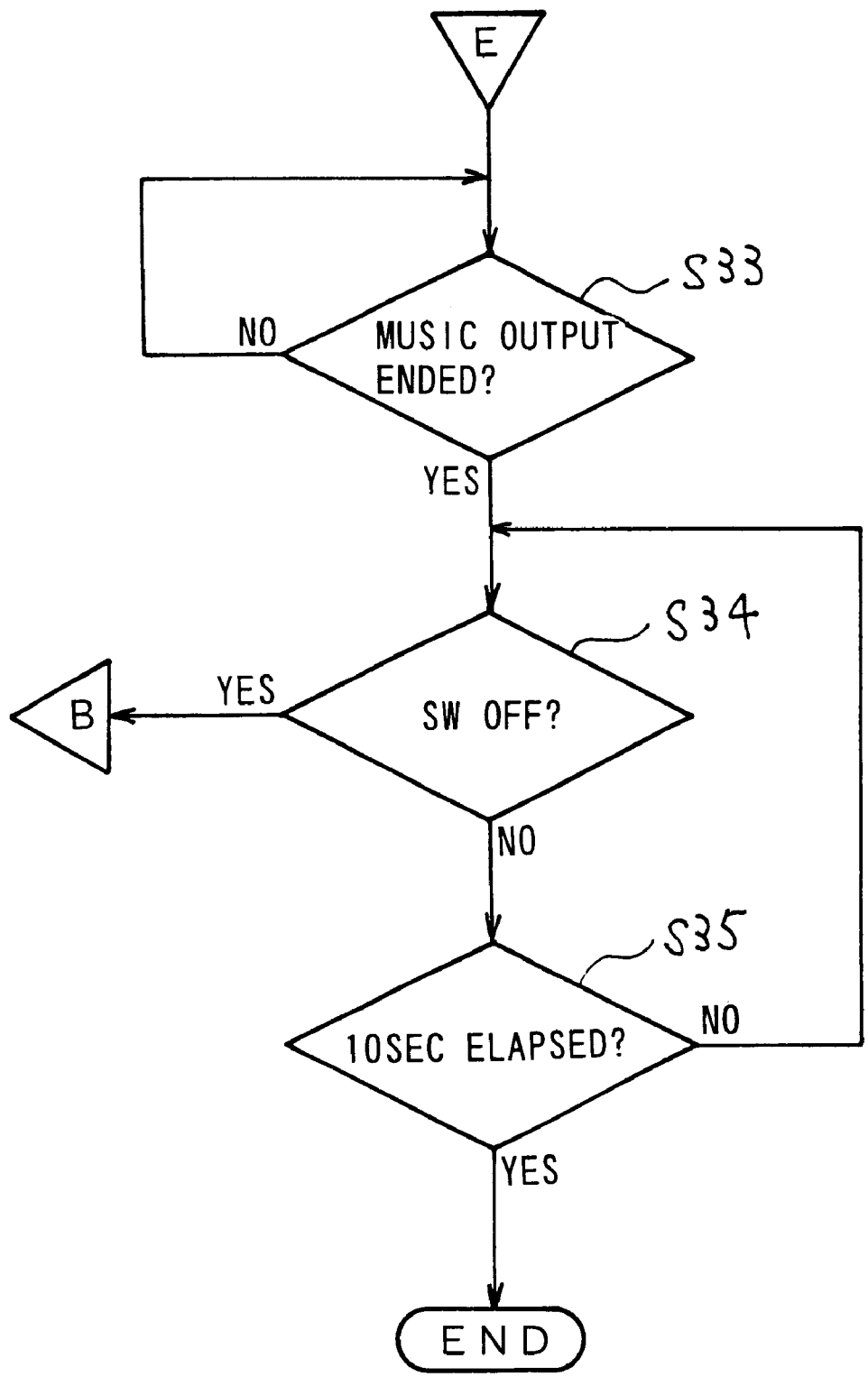
FIG. 6 is a flow chart of the operation to show a subroutine.

When the end of the disk is detected (S22), the sequence proceeds to the subroutine shown in FIG. 6. After the disk end has been detected, the data remaining in the memory 5 is continuously output. Within an allowance period of 10 seconds after the data in the memory 5 has been completely output (S33, S35), the system control circuit 3 checks whether the switch SW is off, i.e., whether the disk has been replaced (S34). If no disk change is made within 10 seconds, the playback operation is terminated. When the disk has been replaced, the new disk is played back.

Figure 4:
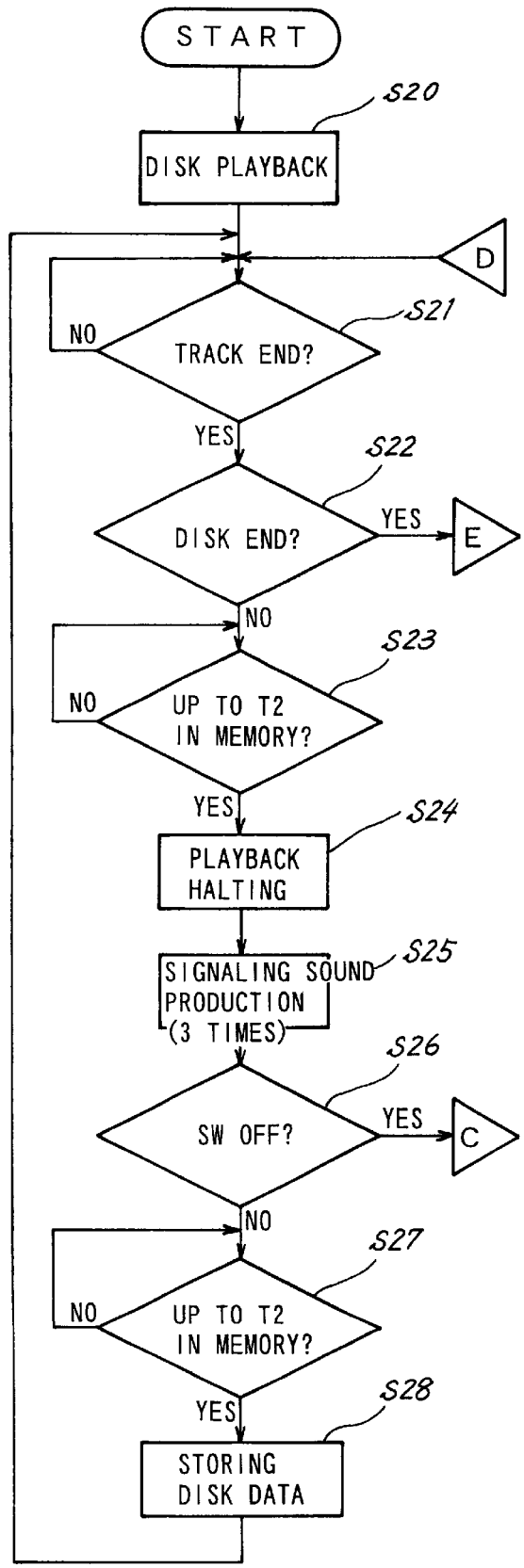
FIG. 4 is a flow chart showing an operation according to another embodiment and involving the detection of the disk end.
Figure 5:
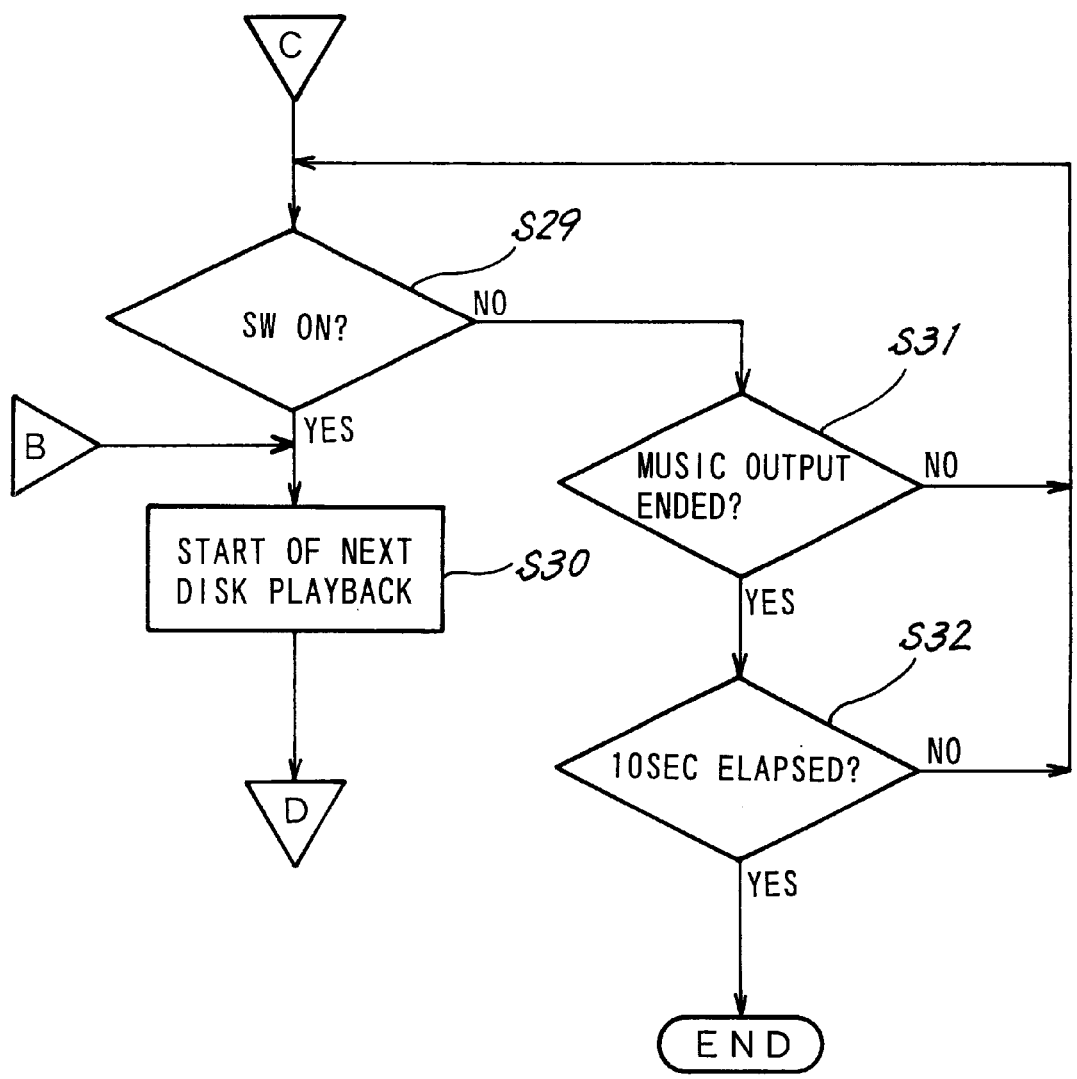
FIG. 5 is a flow chart of the operation.

When the quantity of data remaining in the memory 5 is found to be not greater than T2 in step S23 shown in FIG. 4, the system control circuit 3 temporarily stops playing back the disk (S24) and activates the signaling sound generating circuit 9. As previously stated, the circuit 9 repeats three times the cycle of producing a signaling sound for 200 msec and subsequently ceasing for 300 msec (S25). At the same time, the display portion 1 is caused to flash. However, the memory 5 continues to produce the music signal for the user to continuously listen to the music.

Next, the system control circuit 3 reads the contents of the auxiliary memory 32 to check whether a disk change has been made, i.e. whether the closure 7 has been opened once, during steps S23 to S25 (S26). Unless the opening of the closure 7 is detected in step S26, the system control circuit 3 checks the memory 5 for the quantity of data therein (S27), reproduces the piece of music in the next track and stores the data of the next track in a vacant location of the memory 5 (S28). When the memory 5 is full, the data stored first is output to repeat the above operation.

When the opening of the closure 7 is detected in step S26, the system control circuit 3 checks whether the closure 7 is currently closed, i.e., whether a disk change has been made (S29).

If the closure 7 remains open, this indicates that the disk is being replaced, hence no playback of disk. The system control circuit 3 checks whether the data in the memory 5 has been completely output (S31). If the data in the memory 5 still remains to be output, the sequence returns to step S29. On completion of data output, the system control circuit 3 actuates the timer means 30, counting the allowance period of 10 seconds (S32). If the closing of the closure 7 is not detected within the allowance period, the disk playback operation is terminated.

When the closing of the closure 7 is detected in step S29, the first track of the disk newly placed in is played back, and the data is stored in the memory 5 (S30).

A plurality of music pieces are stored in the tracks of the disk according to the embodiment described, whereas only one piece of music having a long playing time may be recorded on the disk.

What is claimed is:

1. A disk playback device having data read means for reading data from a disk being played back, and a memory for temporarily storing the data from the data read means and outputting the data as delayed by a predetermined period of time, the disk playback device being characterized in that the device comprises end sensor means for detecting a playback end of the disk from the data from the data read means, means for notifying that the end sensor means has detected the playback end of the disk, disk change detecting means for checking whether a change of disk has been made during delivery of the data from the memory after the notification by the notifying means, and means for terminating playback upon detecting no change of disk within an allowance period after the data has been completely output from the memory.

2. A disk playback device according to claim 1 which further comprises means for detecting the quantity of data remaining in the memory upon the end sensor means detecting the end of the disk, the data quantity detecting means having a predetermined threshold value for the quantity of data remaining in the memory, the notifying means being operable according to the result of comparison between the quantity of data in the memory and the threshold value.

3. A disk playback device according to claim 2 wherein the data quantity detecting means has two predetermined threshold values T1 and T2, the threshold value T1 being greater than the threshold value T2, and the notifying means performs different notifying operations when the quantity of data remaining in the memory is not smaller than the greater threshold value T1 and when the remaining quantity is not greater than the small threshold value T2.

4. A disk playback device having data read means for reading data from a disk having at least one item of information recorded on each of tracks, and a memory for temporarily storing the data from the data read means and outputting the data as delayed by a predetermined period of time, the disk playback device being characterized in that the device comprises end sensor means for detecting a playback end of each track from the data from the data read means, means for detecting the quantity of data remaining in the memory upon the end sensor means detecting the track end, means for notifying that the quantity of data remaining in the memory and detected by the data quantity detecting means is not greater than a predetermined value if the detecting means detects this result, disk change detecting means for checking whether a change of disk has been made during delivery of the data from the memory after the notification by the notifying means, and means for terminating playback upon detecting no change of disk within an allowance period after the data has been completely output from the memory.

5. A method of terminating playback of a disk with use of data read means for reading data from the disk, the disk having at least one item of information recorded on each of tracks, and a memory for temporarily storing the data from the data read means and outputting the data as delayed by a predetermined period of time, the method comprising notifying that the quantity of data remaining in the memory is not greater than a predetermined value when this result is detected upon detecting a track end while the disk is being played back, checking whether a change of disk has been made during delivery of the data from the memory after the notification, and terminating playback upon detecting no change of disk within an allowance period after the data has been completely output from the memory.

* * * * *

UNITED STATES PATENT AND TRADEMARK OFFICE
CERTIFICATE OF CORRECTION

PATENT NO. : 6,104,678
DATED : August 15, 2000
INVENTOR(S) : Matsumoto et al.

It is certified that error appears in the above-indentified patent and that said Letters Patent is hereby corrected as shown below:

On the title page of the patent in item [75], change the name of the fourth inventor, "Shinya Miyazona" to be --Shinya Miyazono--

Signed and Sealed this

Twenty-fourth Day of April, 2001

Attest:

NICHOLAS P. GODICI

*Attesting Officer*   *Acting Director of the United States Patent and Trademark Office*